US010067533B1

(12) United States Patent
Powell et al.

(10) Patent No.: US 10,067,533 B1
(45) Date of Patent: Sep. 4, 2018

(54) LOCKING DOCK FOR PORTABLE ELECTRONIC DEVICE (71) Applicant: Precision Mounting Technologies Ltd., Calgary (CA)

(72) Inventors: Reuben C. G. Powell, Calgary (CA); Jozef P. Holewski, Calgary (CA)

(73) Assignee: Precision Mounting Technologies Ltd., Calgary (CA)

( * ) Notice: Subject to any disclaimer, the term of this patent is extended or adjusted under 35 U.S.C. 154(b) by 0 days.

(21) Appl. No.: 15/937,191

(22) Filed: Mar. 27, 2018

(51) Int. Cl.
G06F 1/16 (2006.01)

(52) U.S. Cl.
CPC .......... *G06F 1/1632* (2013.01); *G06F 1/1616* (2013.01); *G06F 1/1679* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,946,120 A * | 8/1990 | Hatcher | ............... | B60R 11/0252 108/44 |
| 5,177,665 A * | 1/1993 | Frank | .................. | B60R 11/0252 108/44 |
| 5,751,548 A * | 5/1998 | Hall | ........................ | F16C 11/10 248/122.1 |
| 5,859,762 A * | 1/1999 | Clark | ..................... | F16M 11/10 248/122.1 |
| 6,266,243 B1 * | 7/2001 | Tomioka | ............... | G06F 1/1632 165/104.33 |
| 6,542,360 B2 * | 4/2003 | Koizumi | ............... | G06F 1/1632 165/80.3 |
| 7,417,855 B2 * | 8/2008 | Carnevali | ............. | G06F 1/1632 312/223.1 |
| 7,499,272 B2 * | 3/2009 | Searby | ................. | F16M 11/041 248/917 |
| 7,502,226 B2 * | 3/2009 | Searby | ................. | F16M 11/041 361/679.41 |
| 7,883,063 B2 * | 2/2011 | Mesfin | ................... | F16M 11/24 248/123.11 |
| 7,911,779 B1 * | 3/2011 | Tarnoff | ................. | G06F 1/1626 361/679.4 |

(Continued)

OTHER PUBLICATIONS

"NotePad V Screen Support", web page, 1 page, site visited Mar. 23, 2018, Gamber-Johnson LLC, http://www.gamberjohnson.com/products/screen-support.

(Continued)

*Primary Examiner* — Lisa Lea Edmonds
(74) *Attorney, Agent, or Firm* — Michael Best & Friedrich LLP (57) ABSTRACT A docking station is provided for a portable electronic device having a keyboard portion and a display portion that is removably coupled to the keyboard portion. The docking station includes a base for supporting the keyboard portion, and a display support coupled to the base and configured to support the display portion when the display portion is coupled to the keyboard portion. The display support includes a lock configured to selectively engage the display portion of the portable electronic device and prevent removal of the display portion from the keyboard portion when the lock is in a locked state.

30 Claims, 9 Drawing Sheets (56) References Cited

U.S. PATENT DOCUMENTS

| | | | | |
|---|---|---|---|---|
| 8,179,672 B2* | 5/2012 | Carnevali | ............ | G06F 1/1632 |
| | | | | 361/679.41 |
| 8,182,426 B2* | 5/2012 | Zhao | ................ | A61B 8/00 |
| | | | | 361/679.21 |
| 8,315,048 B2* | 11/2012 | Tarnoff | ............... | G06F 1/1626 |
| | | | | 361/679.4 |
| 8,821,173 B2* | 9/2014 | Carnevali | ............ | G06F 1/1632 |
| | | | | 361/679.41 |
| 9,036,343 B2* | 5/2015 | Carnevali | ............ | G06F 1/1632 |
| | | | | 361/679.41 |
| 9,833,064 B2* | 12/2017 | Demski | ............ | A47B 21/0314 |
| 2005/0111182 A1* | 5/2005 | Lin | ................ | G06F 1/1632 |
| | | | | 361/679.41 |

OTHER PUBLICATIONS

"New Gamber Johnson Docking StationScreen Support 7110-1023", web page, 2 pages, site visited Mar. 23, 2018, Ebay, http://www.ebay.com/itm/like/382329398220.
"Screen Support for Panasonic CF-33 Laptop Docking Station/Cradle", web page, 4 pages, site visited Mar. 23, 2018, Gamber-Johnson LLC, http://www.gamberjohnson.com/products/screen-support-panasonic-cf-33-docking-station.

* cited by examiner

LOCKING DOCK FOR PORTABLE ELECTRONIC DEVICE

BACKGROUND

The present invention relates to docking stations for portable electronic devices.

A recent trend in rugged mobility portable electronic devices has seen a push toward 2-in-1 devices. These are devices having a tablet computer that can be selectively connected and disconnected from a keyboard. These 2-in-1 devices provide the versatility and advantages of both a laptop computer and a tablet computer. The proliferation of such 2-in-1 devices necessitates the need for new and improved docking stations that cooperate with and seamlessly support and maximize the versatility of these 2-in-1 devices.

SUMMARY

In one aspect, the invention provides a docking station for a portable electronic device having a keyboard portion and a display portion that is removably coupled to the keyboard portion. The docking station includes a base for supporting the keyboard portion, and a display support coupled to the base and configured to support the display portion when the display portion is coupled to the keyboard portion. The display support includes a lock configured to selectively engage the display portion of the portable electronic device and prevent removal of the display portion from the keyboard portion when the lock is in a locked state.

In another aspect, the invention provides a display support for use with a base on which a keyboard portion of a 2-in-1 computer is supported. The 2-in-1 computer includes the keyboard portion and a display portion removably coupled to the keyboard portion. The display support includes a mounting portion configured to be coupled to a base, a housing portion pivotally coupled to the mounting portion, and a lock coupled to the housing portion for selectively engaging the display portion of the 2-in-1 computer and preventing removal of the display portion from the keyboard portion when the lock is in a locked state.

In another embodiment the invention provides a method of locking a 2-in-1 computer, including a keyboard portion and a display portion removably coupled to the keyboard portion, to a docking station having a base and a display support coupled to the base. The method includes coupling the keyboard portion and the display portion together, positioning the keyboard portion on the base of the docking station, locking the keyboard portion to the base using a first lock on the base, positioning the display support adjacent the display portion, and locking the display support to the display portion using a second lock on the display support, thereby preventing removal of the display portion from the keyboard portion.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
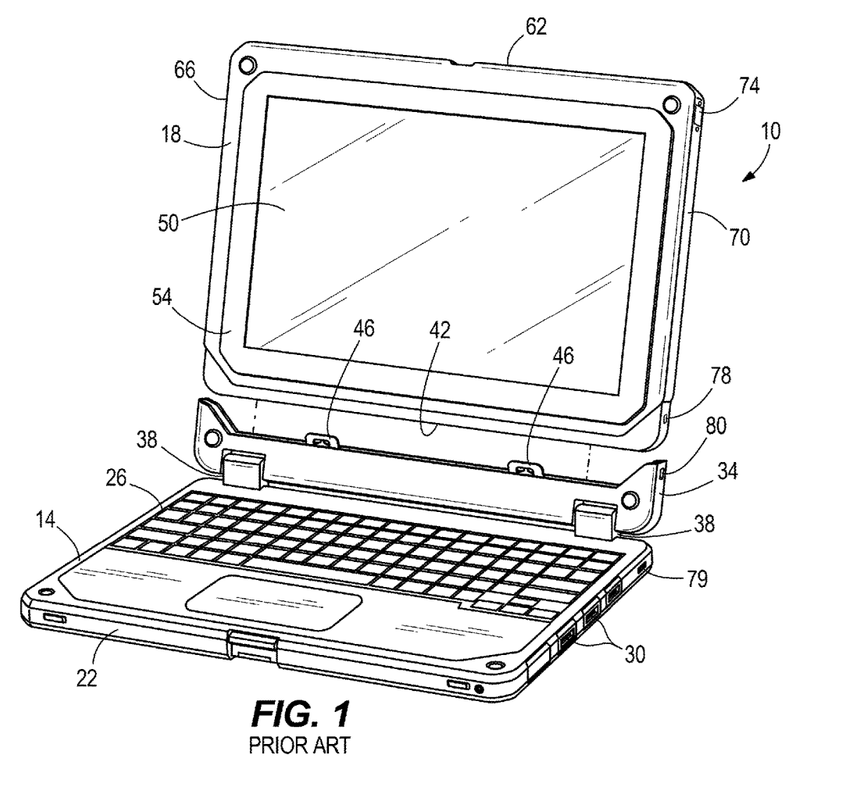
FIG. 1 is a perspective view of a prior art 2-in-1 portable electronic device.
Figure 2:
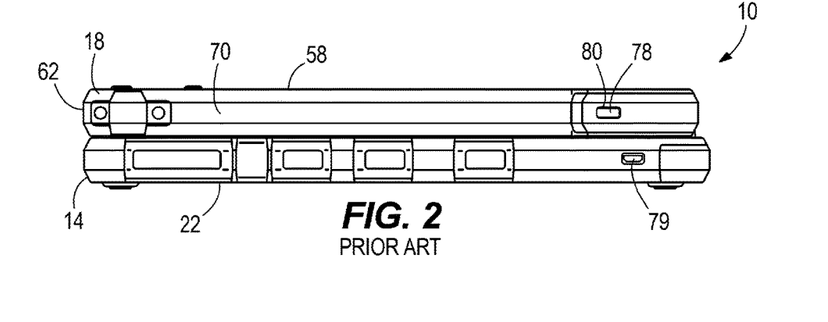
FIG. 2 is a side view of the prior art portable electronic device of FIG. 1 in a closed position and with the display portion coupled to the keyboard portion.

FIGS. 1 and 2 illustrate an example of a prior art portable electronic device 10 of the type known as a 2-in-1 electronic device or computer. The illustrated device 10 is a Panasonic Toughbook CF-20, and represents just one example of known 2-in-1 computers.

The electronic device 10 includes a keyboard portion 14 and a display portion 18 that can be repeatedly connected together/attached (see FIG. 2), and disconnected/detached (see FIG. 1). The display portion 18 is operable independently from the keyboard portion 14 as a self-contained tablet computer. However, it is often desirable to couple the display portion 18 with the keyboard portion 14 to enable greater functionality than the display portion 18 is capable of on its own.

The keyboard portion 14 includes a body 22 that includes the keyboard 26 as well as various ports and connections 30. The body 22 also houses various internal components of the device 10. The keyboard portion 14 further includes a receiver or cradle 34 that is pivotally coupled (e.g., via hinges 38) to the body 22. The receiver 34 is sized and configured to accept and retain an edge 42 of the display portion 18 for removably coupling the display portion 18 to the keyboard portion 14. A latching arrangement (not shown) is provided to secure the display portion 18 in the receiver 34. One or more release devices (e.g., levers, switches, buttons, etc.—not shown) are provided on one or both of the keyboard portion 14 and the display portion 18, so that when activated, the display portion 18 can be disconnected and removed from within the receiver 34. The receiver 34 includes electrical connectors 46 operable to electrically connect to mating connectors (not shown) in the edge 42 of the display portion 18.

The display portion 18 includes a display screen 50 on a first or front face 54. The display portion further includes a second or rear face 58, and edges 42, 62, 66, and 70. The edges 42, 62, 66, and 70 can include various ports and connections 74. Additionally, the edge 70 includes an aperture or slot 78 sized and configured to receive a lock of the type conventionally available for locking computers. The illustrated slot 78 is known in the art as a Kensington security slot or K-slot, although other types of security apertures or openings are also contemplated by the present invention. The slot 78 is a cavity formed within the edge 70 of the display portion 18, with access to the cavity provided by an opening in the housing material that defines the edge 70. The keyboard portion 14 can also include a separate security slot 79. In the illustrated embodiment, the receiver 34 includes an aperture 80 that is in alignment with the slot 78 when the display portion 18 is received in the receiver 34. The aperture 80 permits access to the slot 78 so that the slot can be used when the display portion 18 is mated or docked with the keyboard portion 14. In other embodiments of 2-in-1 computers, the slot 78 may be spaced apart from the receiver 34 such that no aperture 80 is required to access the slot 78 when the display portion 18 is mated or docked with the keyboard portion 14.

FIGS. 3-9 illustrate a docking station 82 according to the present invention, which is designed to both support and lock the 2-in-1 device 10. More specifically, the docking station 82 is designed to actively and separately lock both the keyboard portion 14 and the display portion 18 when the keyboard portion 14 and the display portion 18 are attached/connected to one another and to the docking station 82. In this manner, the dock 82 prevents unauthorized removal of the display portion 18 from the keyboard portion 14 when the two components are attached together and secured in the docking station 82. It is to be understood that while the docking station 82 of the present invention is illustrated as being constructed to mate with the Panasonic Toughbook CF-20, the invention can be practiced with any brand, type, or style of 2-in-1 computer products with only minor modifications that will be discussed below.

Figure 3:
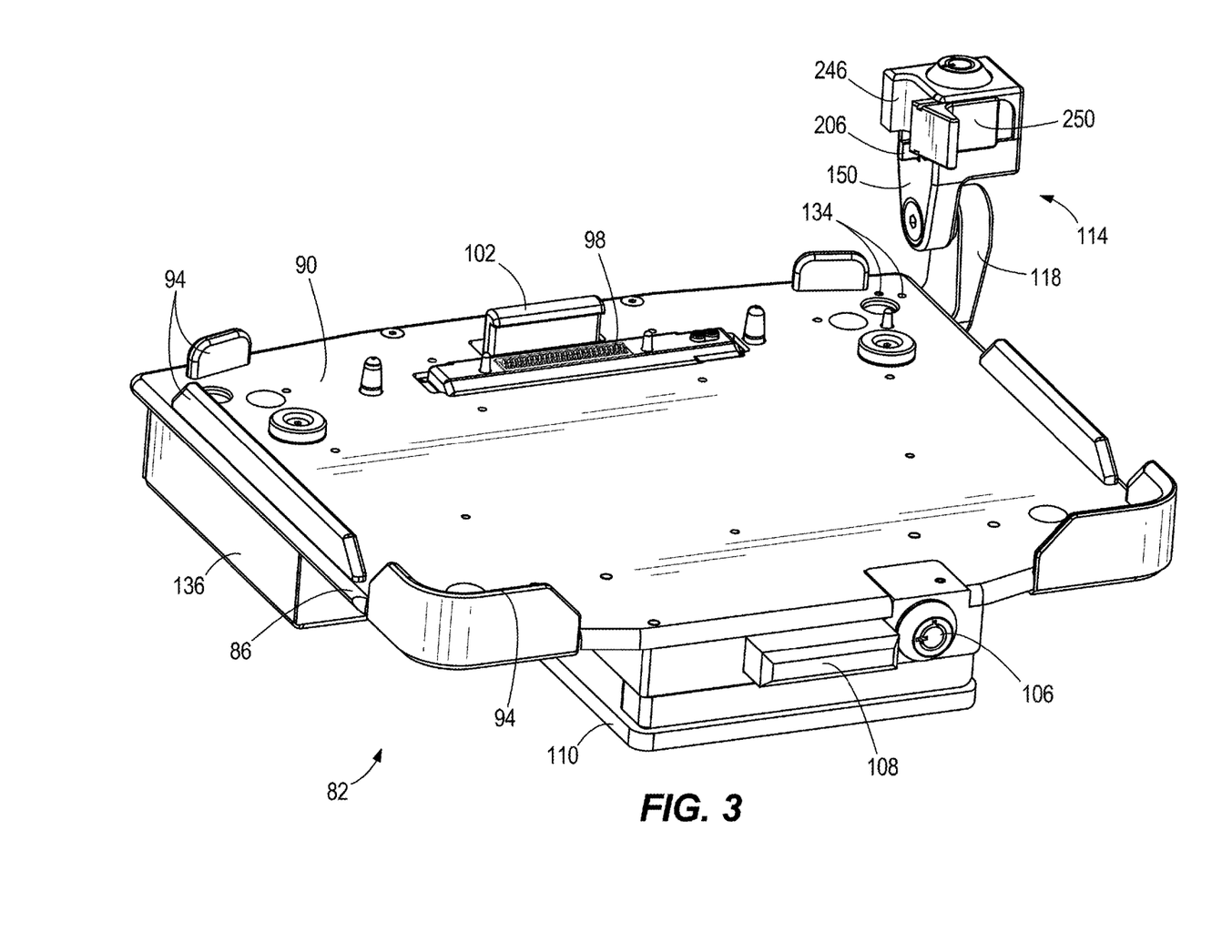
FIG. 3 is a perspective view of a docking station embodying the present invention and configured to support the 2-in-1 portable electronic device of FIGS. 1 and 2.

Referring to FIG. 3, the docking station 82 includes a base 86 sized and configured for supporting the keyboard portion 14. The base 86 includes an upper base surface 90 on which a bottom surface of the body 22 of the keyboard portion 14 is supported. A plurality of guide projections 94 extend from the surface 90 and are positioned about the periphery of the surface 90 to engage and align the body 22 of the keyboard portion 14 relative to the base 86 of the dock 82. An optional electrical connector 98 extends from the surface 90 and is sized and configured to connect with a mating electrical connector on the bottom surface of the body 22. In other embodiments, no electrical connector need be present. A latch 102 also extends from the surface 90 and cooperates with a mating latch-receiving portion (not shown) on the bottom surface of the body 22 to secure the body 22 to the base 86. A lock 106 (e.g., a keyed cylinder lock) is coupled to the base 86 and is operable (by insertion and rotation of a key 107) to prevent movement of the latch 102 when the latch 102 engages and cooperates with the mating latch-receiving portion on the body 22 so that the keyboard portion 14 cannot be removed from the base 86. In the illustrated embodiment, a latch release lever or button 108 extends from a front of the base 86 and can be actuated by a user to release the latch 102. The lock 106 is operable to allow or prevent actuation of the latch release lever or button 108. In other embodiments, any suitable linkage or mechanism can be provided between the lock 106 and the latch 102 to enable the latch 102 to be rendered movable or immovable when the lock is unlocked or locked, respectively. In yet other embodiments, various other arrangements can be used to lock the keyboard portion 14 to the base 86 using a lock on the base 86.

The base 86 can also include electronics and ports/connectors (not shown), as is understood in the art. The base 86 can further include mounting structure 110 designed to mount the base 86 to a support, such as a desk, a wall, a movable cart, a mobile mount support of the type used in vehicles, and the like.

Figure 4:
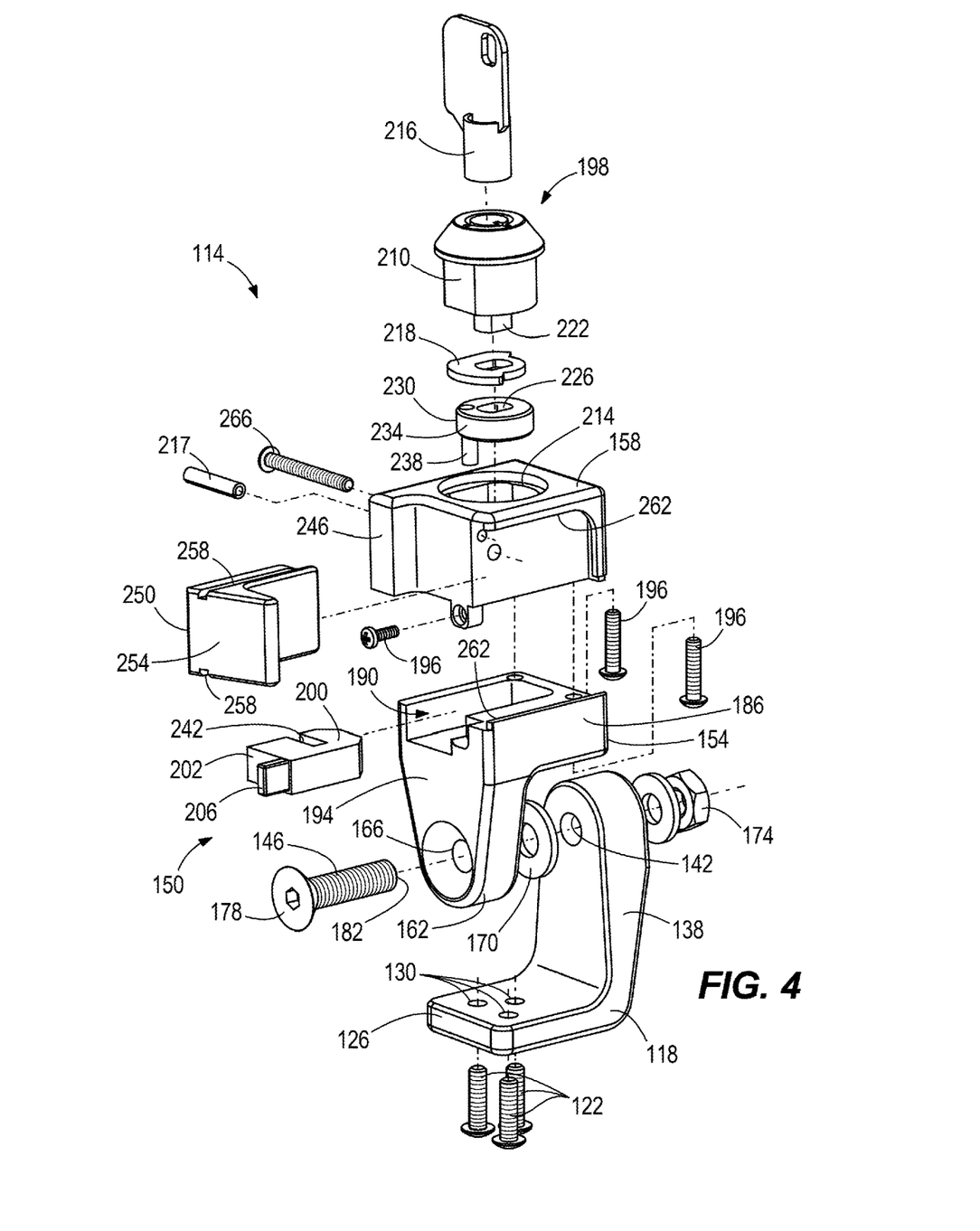
FIG. 4 is an exploded view of the display support of the docking station of FIG. 3.

The docking station 82 further includes a display support 114 coupled to the base 86 for providing support and stability to the display portion 18. The display support 114 is particularly useful when the docking station 82 is used in a vehicle so that motion of the vehicle does not unintentionally move the display portion 18 of the device 10. The display support 114 can be sold with the docking station 82, or can be an accessory that is sold separately from the base 86. With reference to FIG. 4, the display support 114 includes a mounting portion 118 that can be mounted to or coupled with the base 86 using fasteners 122. The fasteners 122 are oriented and positioned relative to the base 86 and to the mounting portion 118 so that the display support 114 cannot be detached from the base 86 when the electronic device 10 (and particularly the keyboard portion 14) is coupled to the base 86.

In the illustrated embodiment the mounting portion 118 is generally L-shaped with a generally planar platform portion 126 having holes 130 therein for receiving the fasteners 122 (e.g., screws). The fasteners 122 are installed such that when the keyboard portion 14 is docked to the base 86, the fasteners 122 are inaccessible and not removable so that the mounting portion 118 cannot be disconnected from the base 86. For example, in one exemplary embodiment shown in FIG. 3, threaded fasteners 122 are inserted upwardly from beneath the platform portion 126, through the holes 130, and into threaded apertures 134 (only two are shown in FIG. 3) provided in the base 86. A base housing or cover member 136 is secured to the underside of the base 86 to protect and secure the inner components of the dock 82. As best shown in FIG. 10C, this underside cover member 136 covers the platform portion 126 and holes 130 after the display support 114 has been secured to the base 86, thereby restricting access to the fasteners 122, so that the display support 114 cannot be removed from the base 86. Furthermore, when the keyboard portion 14 is docked to the base 86, the apertures 134 are covered by the keyboard portion 14 and cannot be accessed. This secures the display support 114 and prevents tampering or removal of the display support 114 from the base 86.

The mounting portion 118 further includes a pivot support portion or arm 138 that extends away from and generally normal to the platform portion 126. The pivot support arm 138 includes a hole or aperture 142 for receiving a pivot pin 146 (discussed further below).

The display support 114 further includes a housing portion 150 pivotally coupled to the mounting portion 118. In the illustrated embodiment, the housing portion 150 has a first or lower housing portion 154, and a second or upper housing portion 158 that are coupled together. The lower housing portion 154 is generally L-shaped with a pivot support portion or arm 162 that includes a hole or aperture 166 (e.g., a countersunk hole) that is aligned with the hole 142 in the pivot support arm 138 of the mounting portion 118. The pivot pin 146, which in the illustrated embodiment is a bolt, extends through each of the holes 142 and 166 to pivotally couple the housing portion 150 with the mounting portion 118. A washer 170 can be positioned between the respective pivot support arms 138 and 162, and a nut 174 can secure the bolt 146 in place. In other embodiments, the hole 142 can be threaded so that the nut 174 and any adjacent washer(s) can be eliminated.

Just as it is important that the fasteners 122 are installed in a manner that prevents the display support 114 from being disconnected from the base, it is also important that the pivot pin 146 be installed in a manner that prevents the housing portion 150 from being disconnected from the mounting portion 118 when the device 10 is docked. Specifically, the pivot pin 146 has a head 178 and a distal end 182. The pivot pin 146 is oriented within the holes 142, 166 such that a distance between the base 86 and the head 178 is smaller than a distance between the base 86 and the distal end 182. In other words the pivot pin 146 is installed first through the aperture 166 in the first housing portion 154 in a direction toward the mounting portion (in the orientation shown in FIG. 4). In this manner, when the device 10 is mounted in the docking station 82 (see e.g., FIGS. 7 and 9), the pivot pin 146 cannot be removed because the presence of the keyboard portion 14 prevents withdrawal of the pivot pin 146 from within holes 142, 166. The nut 174 can be tightened or loosened as desired to increase or decrease the ease (i.e., friction) with which the housing portion 150 can pivot relative to the mounting portion 118.

The lower housing portion 154 further includes a base portion 186 coupled to the pivot support arm 162. The illustrated base portion 186 extends generally normally from the pivot support arm 162 and defines therein at least a portion of a recess or cavity 190. As will be discussed in greater detail below, the recess 190 is accessible laterally from an inner surface 194 of the lower housing portion 154.

The upper housing portion 158 is sized and configured to be coupled to the lower housing portion 154 such that the recess 190 is enclosed or surrounded by the upper and lower housing portions 158, 154 on all sides except for the lateral access provided at the inner surface 194. The upper and lower housing portions 158, 154, can be connected together in any suitable manner, including by fasteners 196. In the illustrated embodiment, the recess 190 is formed entirely within the lower housing portion 154, but in other embodiments, the recess 190 could be formed by aligned recesses in both the upper and lower housing portions 158, 154, or by a recess in only the upper housing portion 158.

The display support 114 further includes a lock 198 that is operable to selectively contact, abut, or otherwise engage (collectively referred to as engage, engages, or engaged) the display portion 18 of the portable electronic device 10 and prevent removal of the display portion 18 from the keyboard portion 14 when device 10 is supported in the dock 82 and the lock 198 is in its locked state. The lock 198 includes a locking member, which in the illustrated embodiment is a slider 200 movably positioned in the recess 190. The illustrated slider 200 is a one-piece, metal component having a peripheral footprint that generally corresponds to the peripheral footprint of the recess 190. At lateral inner end 202 of the slider 200 is formed a pawl 206 that is sized and configured to selectively fit into the security slot 78 in the display portion 18, as well as to fit through the aperture 80 in the receiver 34. The illustrated pawl 206 is formed by machining away the adjacent portion of the inner end 202 of the slider 200 to leave the pawl 206 of the desired dimensions; namely, the dimensions suited for receipt of the pawl 206 into the security slot 78. In this manner, the pawl 206 can be formed to whatever configuration is needed to mate with any particular size and configuration of security slot 78 provided in the display portion 18. In other embodiments, the pawl 206 could be a separate component from the rest of the slider 200 such that a pawl 206 of the desired configuration could be coupled (e.g., welded, bolted, or otherwise secured) to the slider 200, thereby providing flexibility in configuring the slider 200 for use with different devices 10.

Figure 5A:
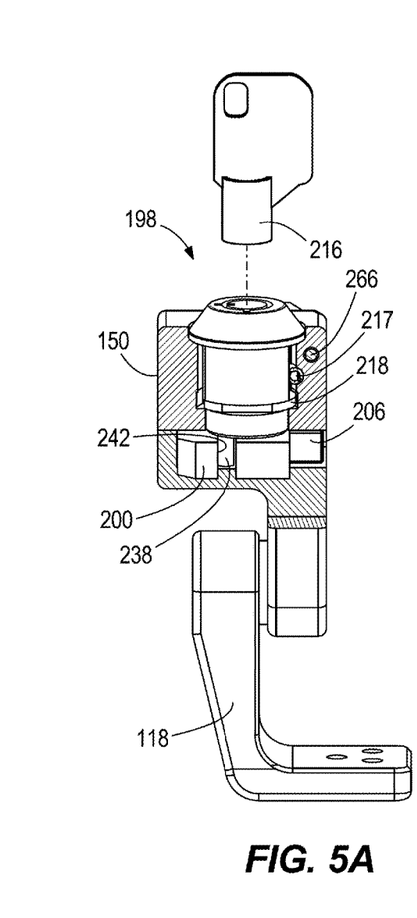
FIGS. 5A-C illustrate the operation of the lock of the display support.
Figure 5B:
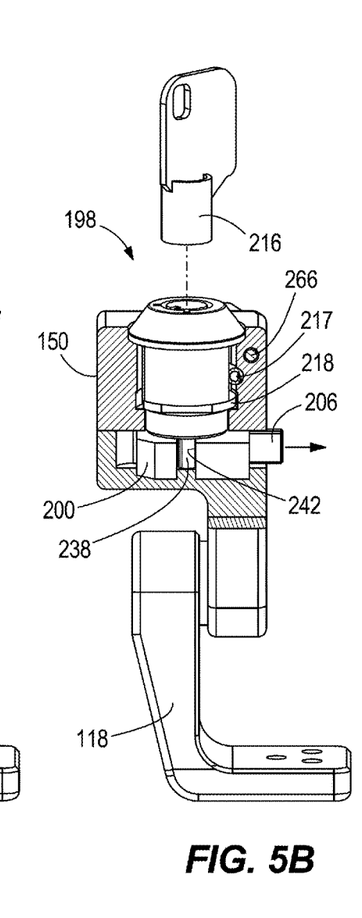
Figure 5C:
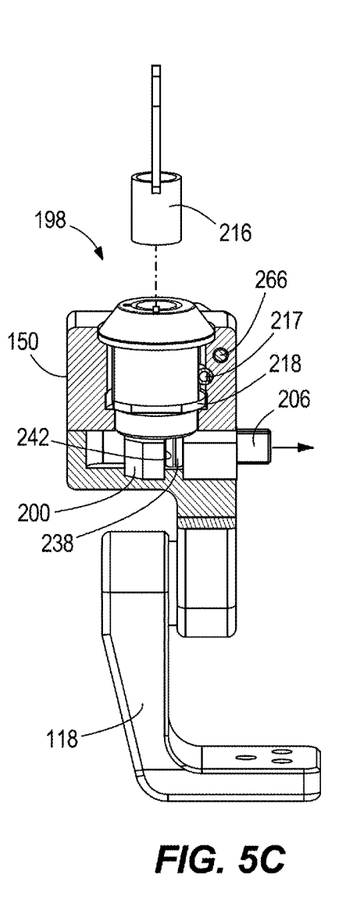

The slider 200 is configured to move (e.g., translate or slide) within the recess 190 and with respect to the rest of the display support 114 (including the housing portion 150 and the mounting portion 118) between a first or unlocked position, in which the pawl 206 does not extend out of the recess 190 (see FIG. 5A), and a second or locked position, in which the pawl 206 extends out of the recess 190 (see FIG. 5C). The slider 200 moves in a direction toward or away from the display portion 18 when the device 10 is docked in the docking station 82. The pawl 206 thus can move into the aperture 80 and the security slot 78 to lock the display portion 18 and the display support 114 together in a locked state, or out of the aperture 80 and the security slot 78 to unlock the display portion 18 and the display support 114 in an unlocked state.

FIGS. 5A-5C illustrate the range of movement of the slider 200 and the pawl 206. The range of motion of the slider 200 is sufficient to ensure that in the fully extended or locked position of the slider 200, the pawl 206 will extend a sufficient distance into the security slot 78 so that the display portion 18 cannot be detached from the keyboard portion 14. Even if the release device were actuated to enable the display portion 18 to be detached from the receiver 34, the display portion 18 could not physically be lifted out of the receiver 34 to the position shown in FIG. 8 because the pawl 206 would be engaged with and received in the security slot 78 and the aperture 80. Even in an alternative device 10, in which the security slot 78 is spaced apart from the receiver 34 such that no aperture 80 in the receiver 34 is required, having the pawl 206 received in the security slot 78 without more would physically prevent a user from lifting the display portion 18 out of the receiver 34 in the only direction available for detachment.

In the retracted or unlocked position of the slider 200, the pawl 206 is completely removed from the security slot 78 so that the display portion 18 can be detached from the keyboard portion 14. While the illustrated embodiment shows the pawl 206 entirely retracted into the recess 190, in other embodiments the pawl 206 may still extend slightly from the recess 190, but not a sufficient amount to engage the display portion 18 (and preferably not enough to engage the receiver 34). To facilitate the robust movement of the slider 200 within the recess 190, the slider 200 and the recess 190 have approximately the same width as measured in a direction perpendicular to the direction of movement of the slider 200. In some embodiments, a low friction material may be included at the interface between the slider 200 and the walls defining the recess 190 to facilitate the movement of the slider 200.

In the illustrated embodiment, the slider 200 is actuated through its range of motion by a keyed cylinder mechanism 210 that is also part of the lock 198. The keyed cylinder mechanism 210 is received in a bore or cavity 214 formed in the upper housing portion 258, and is configured to be actuated by the insertion and rotation of a key 216. A roll pin 217 secures the keyed cylinder mechanism 210 in the cavity 214. A lock stop 218 limits rotation of the cylinder mechanism 210 to ninety degrees of rotation. A drive member 222 of the cylinder mechanism 210 engages a correspondingly-shaped bore 226 in an actuator 230. The actuator 230 has an annular body 234 defining the bore 226. A projection or post 238 extends from the body 234 toward the slider 200 and into an elongated recess or slot 242 in the slider 200. Rotation of the key 216 rotates the drive member 222, which in turn rotates the actuator 230, which in turn moves the post 238 as shown in FIGS. 5A-5C. Movement of the post 238, by virtue of its receipt in the slot 242, converts the rotational motion of the key 216 into translational motion of the slider 200. Those of skill in the art will understand that other types of lock mechanisms can be substituted for the illustrated lock 198 in order to achieve the same locking results. Other methods of creating the translational motion of the slider 200 can alternatively be used. Likewise, while the illustrated slider 200 and pawl 206 are configured to exclusively translate, it should also be understood that pivotal or rotary components to the motion of the pawl 206 are also contemplated.

The display support 114 further includes features for physically engaging and supporting the display portion 18. A fixed flange 246 extends from the housing portion 150 in a direction toward the display portion 18 when the display portion is connected to the keyboard portion 14 and mounted in the dock 82. The flange 246 is configured to engage and support the rear surface 58 of the display portion 18 to prevent unintended or accidental pivoting of the display portion 18 about the hinges 38 in the rearward or opening direction. In the illustrated embodiment, the flange 246 is integrally formed with the upper housing portion 158, however, in other embodiments, the flange 246 could be a separate part coupled to the housing portion 150.

The display support 114 can also include an optional movable tab 250 that selectively extends from the housing portion 150 in a direction toward the display portion 18 to engage and support the front surface 54 of the display portion 18. The tab 250 prevents unintended or accidental pivoting of the display portion 18 about the hinges 38 in the forward or closing direction when the pawl 206 is not engaged with the display portion 18. The illustrated tab 250 is also coupled to the housing portion 150 and translates into and out of position engaging the front surface 54. A user can move the tab 250 by pressing on an activation portion or projection 254 on the tab 250. The illustrated tab 250 has one or more channels 258 that slide on corresponding rails/projections 262 in the upper housing portion 158 and the lower housing portion 154. Alternatively, the channel(s) 262 could be formed in the housing portion 150 to ride on one or more rails/projections 258 on the tab 250. The tab 250 is captured between the upper and lower housing portions 158, 154, and a fastener 266 projects through the housing portion 150 and into an aperture (not shown—e.g., a slot) in the tab 250 to limit movement of the tab 250 in a lateral direction toward the base 86. In alternative embodiments, the tab 250 can be pivotally mounted to the housing portion 150 such that the tab 250 is rotated or pivoted into or out of position adjacent the front surface 54.

Figure 10A:
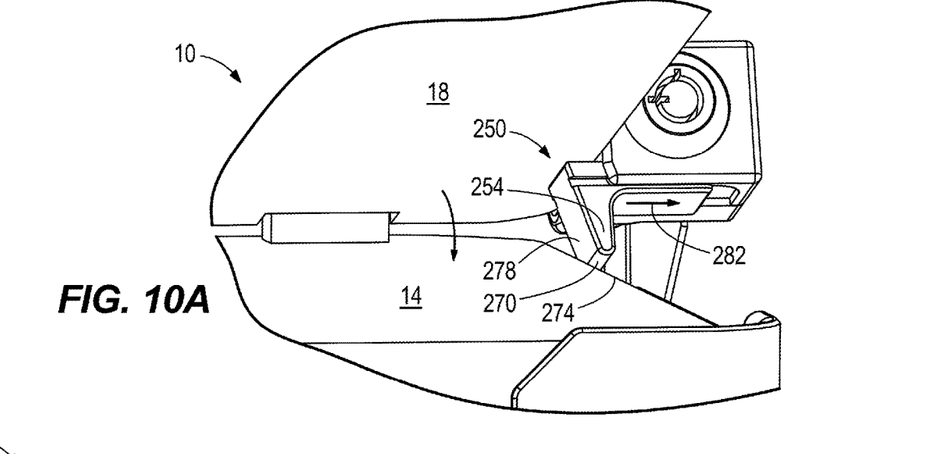
FIGS. 10A-C illustrate the automatic movement of a screen support tab from an extended position to a retracted position as the 2-in-1 computer is moved from an open condition to a closed condition in the docking station.
Figure 10B:
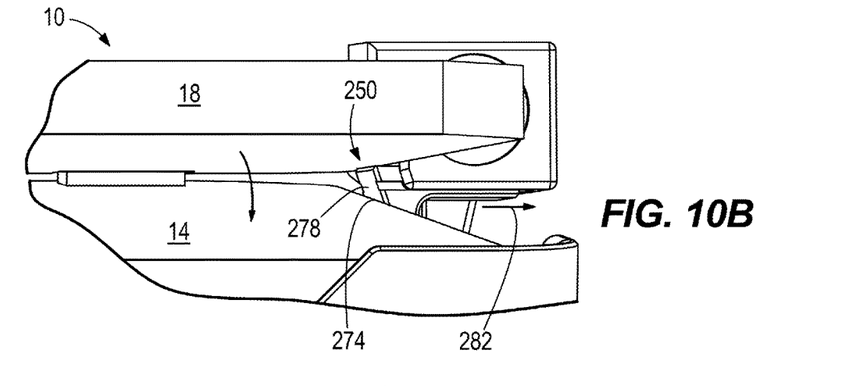
Figure 10C:
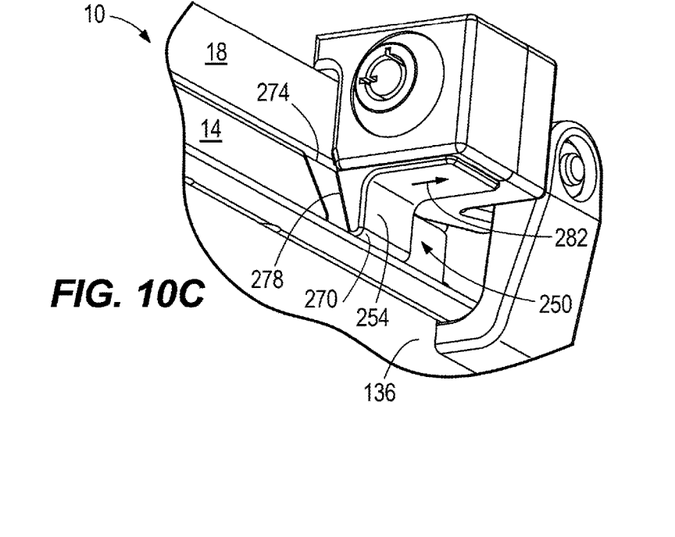

FIGS. 10A-C illustrate how the tab 250 will automatically slide to its retracted position relative to the housing 150 and the remainder of the display support 114, such that it is no longer positioned between the display portion 18 and the keyboard portion 14 if the display portion 18 gets slammed or closed against the keyboard portion 14. FIG. 10A illustrates the tab 250 in its extended position as the display portion 18 approaches the keyboard portion 14, just as the tab 250 engages the keyboard portion 14. The projection 254 is sized and configured such that in its fully-extended position, a distal end 270 of the projection 254 is located laterally outside the adjacent edge 274 of the keyboard portion 14. A laterally inward-facing surface 278 of the projection 254 extends from the distal end 270 and is angled, ramped, or sloped as shown in FIGS. 10A-C such that continued rotational movement of the display portion 18 toward the keyboard portion 14 (i.e., toward the closed position of the electronic device 10) causes a camming action that automatically slides the tab 250 in the direction of arrow 282 to its retracted position. In other words, the ramp or wedge shape of the projection 254, with the slope of the surface 278, enables the surface 278 to slide along the edge 274 and drive the tab 250 to the retracted position as the display portion 18 closes, without damaging either the display portion 18 or the keyboard portion 14.

FIG. 10B illustrates the electronic device 10 moved closer to the closed position with the tab 250 moved further toward the retracted position. FIG. 10C illustrates the electronic device in the fully closed position with the tab 250 fully retracted. The design of the tab 250, to permit its automated retraction during closure of the electronic device 10, protects the display portion 18 and the keyboard portion 14 from being unintentionally damaged. The tab 250 protects the screen of the display portion 18 from being scratched and/or cracked when the display portion 18 is closed against the keyboard portion 14. Those of skill in the art will understand that the movable tab 250 can also be incorporated on display supports that do not include a lock, such as display supports for use with notebooks and laptops that are not 2-in-1 computers.

The spacing between the flange 246 and the tab 250 is determined by the thickness of the display portion 18 and can vary with different devices 10. Likewise, the location of the pawl 206 is determined by the location of the locking slot 78 in the display portion 18 and can vary with different devices 10. However, the pawl 206 is positioned between (albeit not necessarily aligned with) the flange 246 and the tab 250 since the locking slot 78 will be located between the front and rear surfaces 54 and 58 of the display portion 18.

Figure 6:
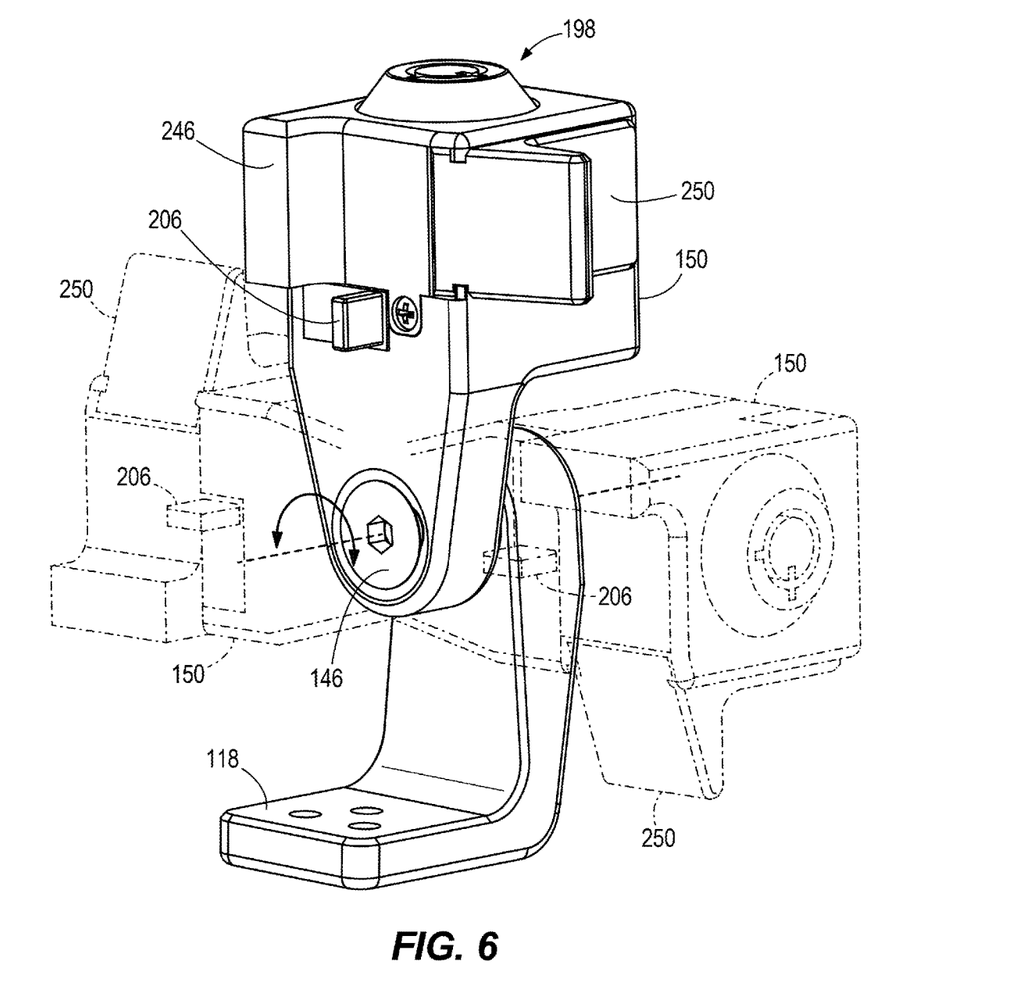
FIG. 6 is a perspective view of the display support illustrating the 180 degree range of motion.
Figure 7:
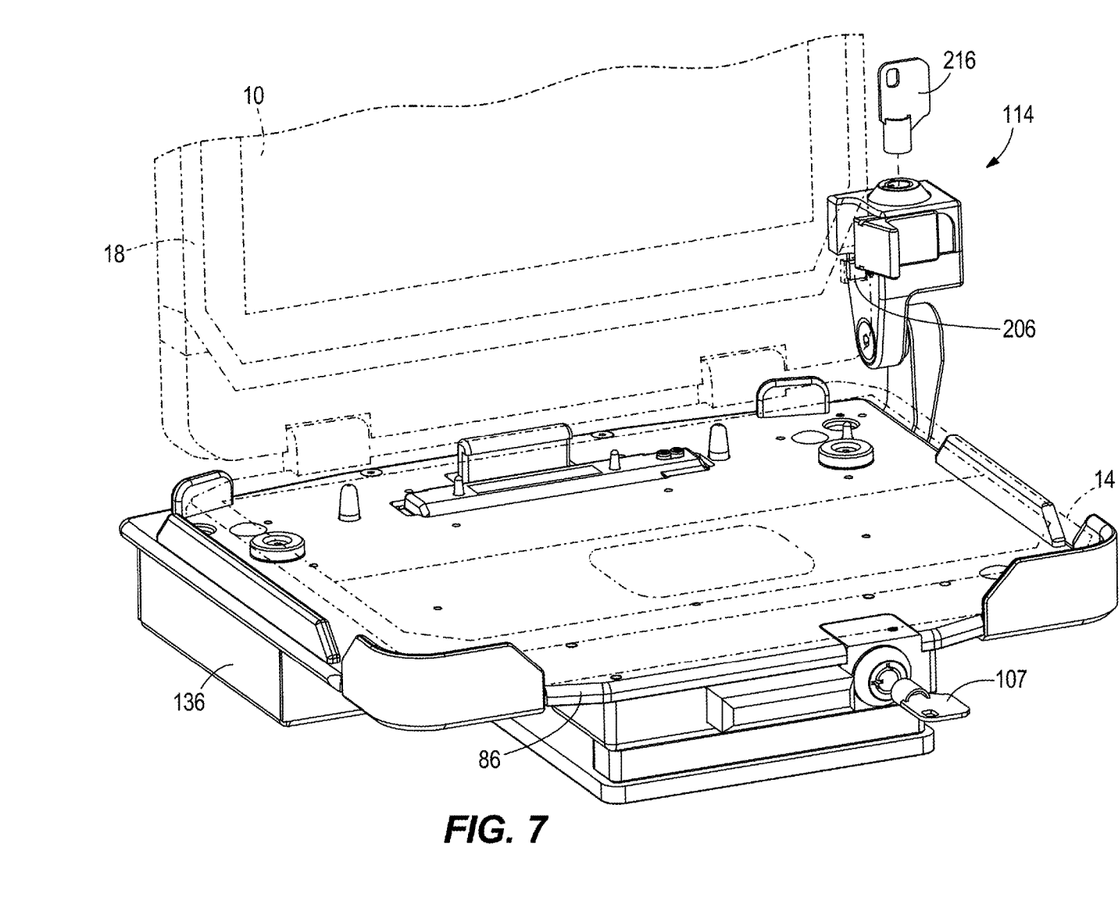
FIG. 7 illustrates the 2-in-1 computer mounted in the docking station in an open and fully locked condition.
Figure 9:
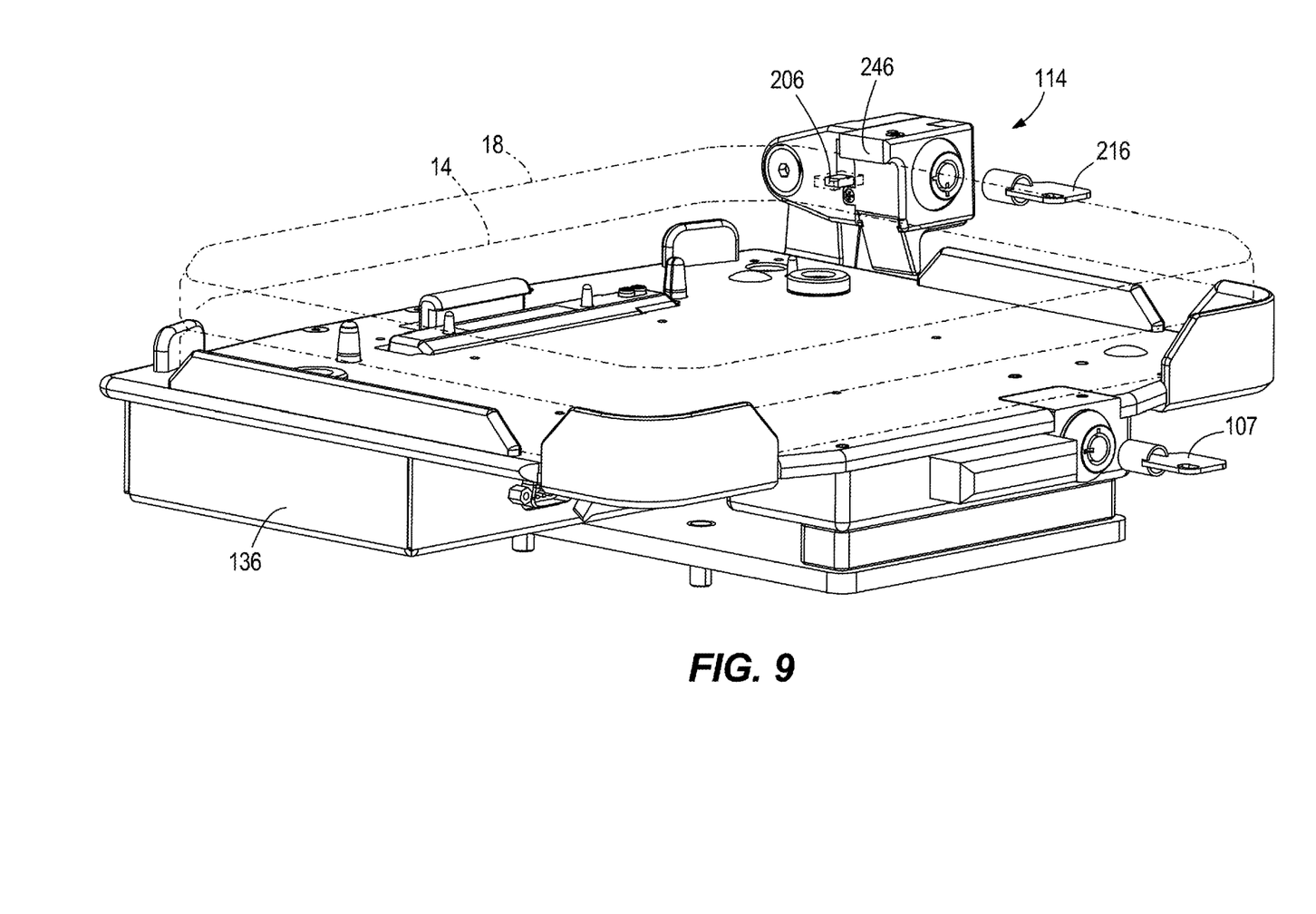
FIG. 9 illustrates the 2-in-1 computer mounted in the docking station in a closed and fully locked condition

FIG. 6 illustrates the range of pivotal motion capable with the display support 114. As seen in FIG. 6, the housing portion 150 can pivot one-hundred eighty degrees relative to the mounting portion 118 (and relative to the base 86). This means that the display support 114 can accommodate motion of the display portion 18 from a fully open position to a fully closed position. Furthermore, the pivot axis defined by the pivot pin 146 coincides with the pivot axis defined by the hinges 38 of the keyboard portion 14 so that the pivot axes defined by the pivot pin 146 and the hinges 38 are parallel. This enables the display portion 18 to be pivoted through one-hundred eighty degrees of motion while mounted in the dock 82 and engaged with the display support 114, even when the pawl 206 is received in the security slot 78. That is, the display portion 18 and the display support 114 can be simultaneously rotated together as a unit through one-hundred eighty degrees of motion when the pawl 206 is received in the security slot 78. FIG. 7 illustrates the docked and fully locked device 10 pivoted to an open position, while FIG. 9 illustrates the docked and fully locked device 10 pivoted to the closed position. In both cases, the pawl 206 is engaged and received in the security slot 78 to lock the display portion 18 to the keyboard portion 14, and the keyboard portion 14 is separately locked to the base 86 by lock 106.

The method of mounting the device 10 to the dock 82 will now be described. In one procedure, the keyboard portion 14 and the display portion 18 are first coupled together by inserting the edge 42 of the display portion 18 into the receiver 34. With the keyboard portion 14 and the display portion 18 connected together, the keyboard portion 14 is engaged with the upper surface 90 of the base 86. The guide projections 94 align the keyboard portion 14 with the base 86 such that the electrical connector 98 engages the mating connector on the bottom of the body 22. The latch 102 engages the latch-receiving portion (not shown) on the bottom of the body 22 to secure the keyboard portion 14 to the body 86. The user can then lock the lock 106 using the key 107 to lock the keyboard portion 14 to the body 86.

Next, the user can pivot the housing portion 150 of the display support 114 forward until the flange 246 engages the rear surface 58 of the display portion 18. The user then locks the lock 198 by rotating the key 216 ninety-degrees to extend the pawl 206 to its locked position, in which the pawl 206 passes through the aperture 80 in the receiver 34 and enters the security slot 78. The user can then extend the optional tab 250 into engagement with the front surface 54 of the display portion. The device 10 is then fully locked, by virtue of both locks 106 and 198 being in their locked configurations. In this fully locked state, the keyboard portion 14 cannot be removed from the base 86 and the display portion 18 cannot be removed from the keyboard portion 14.

Figure 8:
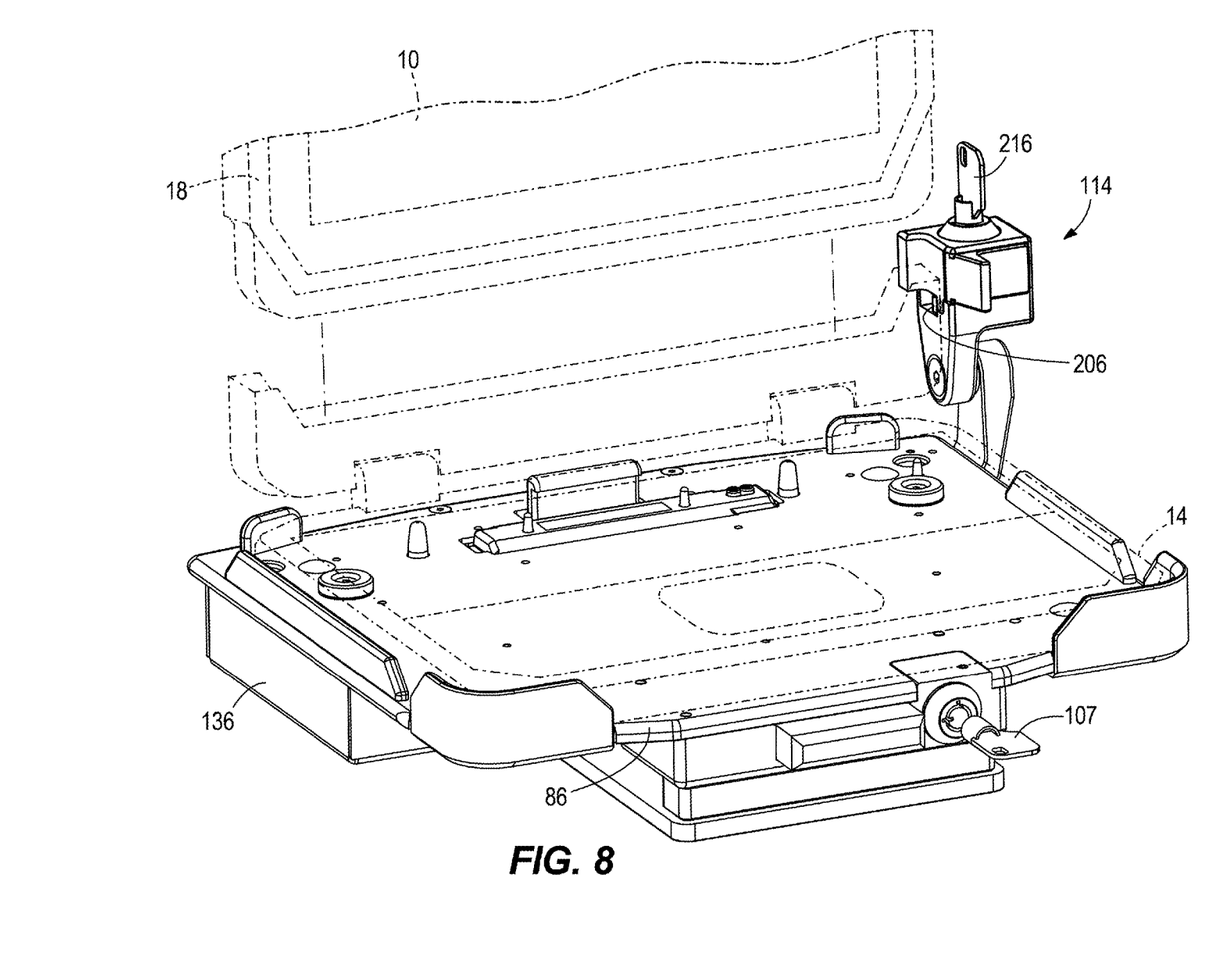
FIG. 8 illustrates the 2-in-1 computer mounted in the docking station in an open and partially locked condition, in which the display portion of the 2-in-1 computer can be detached from the keyboard portion.

Should the user desire to detach the display portion 18 from the keyboard portion 14 for use as a stand-alone tablet computer, the user can first retract the tab 250 from engagement with the front surface 54. Next, the user can insert and rotate the key 216 to the unlocked position of the lock 198 so that the pawl 206 will retract from within the security slot 78 and from within the aperture 80 in the receiver 34, and return into the recess 190. At this point, the user can actuate the release device on the keyboard portion 14 to disengage the display portion 18 from the receiver 34. Because the pawl 206 is not engaged with the display portion 18, the display portion 18 can then be physically separated from the receiver 34. However, the keyboard portion 14 is still locked to the base 86 because the lock 198 is separate and distinct from the lock 106. FIG. 8 illustrates this partially locked configuration. By incorporating the separate locks 106 and 198 to separately lock the keyboard portion 14 and the display portion 18, the versatility and flexibility of the 2-in-1 device is maintained, while still enabling the dock 82 to actively and selectively secure and lock both components 14, 18 of the device 10 to the docking station 82.

Various design alternatives are also contemplated. For example, in some cases the display portion 18 may not include a security slot 78, but instead may include another structural feature that can be engaged by the pawl 206 to prevent detachment of the display portion 18 form the keyboard portion 14. For example, the housing of the display portion 18 might include a shoulder, projection, recess, or rib against which the pawl 206 could abut to prevent detachment of the display portion 18 from the keyboard portion 14. Such a feature could be on the edge 70, or could be on one of the front or rear faces 54, 58. In other embodiments, the pawl 206 could engage/abut the edge 62 of the display portion 18 so that the display portion 18 could not be lifted out of the receiver 34.

In yet other embodiments, the display support 114 may be differently configured to accommodate security slots 78 that are in different locations along the edge 70. For example, if the security slot 78 were closer to the edge 62, the housing portion 150, and specifically the pivot arm 162 and/or the base portion 186 of the lower housing portion 154, could be modified to extend further toward the edge 62 in order to align the pawl 206 with the security slot 78, no matter its location along the edge 70. Care would be taken to keep the pivot pin 146 aligned with the pivot axis of the hinges 38 so that engagement of the pawl 206 in the slot 78 could be maintained throughout the pivotal range of the display support 114. Alternatively, if the security slot 78 were provided in the edge 66 of the display portion 18 instead of in the edge 70, the display support 114 could be designed to be coupled to the opposite side of the base 86 to engage with the edge 62 of the display portion 18.

Various features and advantages of the invention are set forth in the following claims.

What is claimed is:

1. A docking station for a portable electronic device having a keyboard portion and a display portion that is removably coupled to the keyboard portion, the docking station comprising:
a base for supporting the keyboard portion; and
a display support coupled to the base and configured to support the display portion when the display portion is coupled to the keyboard portion, the display support including a lock configured to selectively engage the display portion of the portable electronic device and prevent removal of the display portion from the keyboard portion when the lock is in a locked state;
wherein the display support is pivotally coupled to the base, and wherein when the lock is engaged with the display portion, the display support is pivotable relative to the base.

2. The docking station of claim 1, wherein the lock includes a pawl movable relative to the display support between a locked position, in which the pawl extends from the display support to engage the display portion, and an unlocked position, in which the pawl is not positioned to engage the display portion.

3. The docking station of claim 2, wherein the pawl translates relative to the display support.

4. The docking station of claim 2, wherein the display support includes a housing portion having a recess defined therein, and wherein the pawl is movable into and out of the recess.

5. The docking station of claim 4, wherein the pawl is coupled to a slider that is movably supported in the recess.

6. The docking station of claim 5, wherein the slider includes a recess into which a projection of the lock extends, the projection and recess cooperating such that moving the lock between locked and unlocked states selectively moves the slider within the recess.

7. The docking station of claim 6, wherein the lock is a keyed lock, and wherein rotation of a key in the lock moves the projection to thereby move the lock between the locked and the unlocked states.

8. The docking station of claim 6, wherein the recess in the slider is an elongated slot, and wherein the projection of the lock is a post that extends into the elongated slot.

9. The docking station of claim 2, wherein the display portion includes an aperture, and wherein the pawl extends from the display support when in the locked position to be received into the aperture in the display portion.

10. The docking station of claim 9, wherein the keyboard portion includes a receiver sized and configured to receive the display portion therein, wherein the receiver includes an aperture aligned with the aperture in the display portion, and wherein the pawl extends through the aperture in the receiver and into the aperture in the display portion when in the locked position.

11. The docking station of claim 1, wherein the display support can pivot 180 degrees relative to the base, and wherein the lock can engage and remain engaged with the display portion over an entirety of the 180 degrees of pivoting.

12. The docking station of claim 1, wherein the display support includes a flange extending therefrom for supportably engaging a rear surface of the display portion.

13. The docking station of claim 12, wherein the display support further includes a movable tab operable to selectively engage a front surface of the display portion.

14. The docking station of claim 13, wherein the lock includes a pawl movable relative to the display support between a locked position, in which the pawl extends from the display support to engage the display portion, and an unlocked position, in which the pawl is not positioned to engage the display portion, the pawl being positioned between the flange and the movable tab.

15. The docking station of claim 14, wherein the pawl is part of a movable slider that translates relative to the display support.

16. The docking station of claim 13, wherein the movable tab is movable between an extended position and a retracted position, and wherein the movable tab includes a ramped surface configured to engage the keyboard portion of the portable computer as the portable computer is moved to a closed configuration, such that the movable tab automatically moves from the extended position to the retracted position due to engagement between the ramped surface and the keyboard portion.

17. The docking station of claim 16, wherein the movable tab is slidable relative to a remainder of the display support between the extended and retracted positions.

18. The docking station of claim 1, wherein the base further includes a second lock, distinct from the lock on the display support, for locking the keyboard portion to the base.

19. The docking station of claim 1, wherein the display support includes a mounting portion coupled to the base, a housing portion pivotally coupled to the mounting portion, and a pawl movable relative to the housing portion between a locked position, in which the pawl extends from the housing portion to engage the display portion, and an unlocked position, in which the pawl is not positioned to engage the display portion.

20. The docking station of claim 19, wherein the housing portion is pivotally coupled to the mounting portion by a pivot pin that extends through both an aperture in the housing portion and an aperture in the mounting portion, the pivot pin having a head and a distal end, and wherein the pivot pin is oriented within the apertures such that a distance between the base and the head is smaller than a distance between the base and the distal end.

21. A display support for use with a base on which a keyboard portion of a 2-in-1 computer is supported, the 2-in-1 computer including the keyboard portion and a display portion removably coupled to the keyboard portion, the display support comprising:
a mounting portion configured to be coupled to a base;
a housing portion pivotally coupled to the mounting portion; and
a lock coupled to the housing portion for selectively engaging the display portion of the 2-in-1 computer and preventing removal of the display portion from the keyboard portion when the lock is in a locked state; wherein the lock includes a pawl movable relative to the housing portion between a locked position, in which the pawl extends from the display support to engage the display portion, and an unlocked position, in which the pawl is not positioned to engage the display portion.

22. The display support of claim 21, further comprising a movable tab coupled to the housing portion and movable between an extended position and a retracted position, and wherein the movable tab includes a ramped surface configured to engage the keyboard portion of the 2-in-1 computer as the 2-in-1 computer is moved to a closed configuration, such that the movable tab automatically moves from the extended position to the retracted position due to engagement between the ramped surface and the keyboard portion.

23. The display support of claim 22, wherein the movable tab is slidable relative to the housing portion between the extended and retracted positions.

24. A method of locking a 2-in-1 computer, including a keyboard portion and a display portion removably coupled to the keyboard portion, to a docking station having a base and a display support coupled to the base, the method comprising:
coupling the keyboard portion and the display portion together;
positioning the keyboard portion on the base of the docking station;
locking the keyboard portion to the base using a first lock on the base;
positioning the display support adjacent the display portion;
locking the display support to the display portion using a second lock on the display support, thereby preventing removal of the display portion from the keyboard portion; and
pivoting the display support relative to the base while the display support is locked to the display portion with the second lock.

25. The method of claim 24, further comprising:
unlocking the second lock, thereby permitting the display portion to be uncoupled from the keyboard portion while the keyboard portion remains locked to the base by the first lock.

26. A docking station for a portable electronic device having a keyboard portion and a display portion that is removably coupled to the keyboard portion, the docking station comprising:
a base for supporting the keyboard portion; and
a display support coupled to the base and configured to support the display portion when the display portion is coupled to the keyboard portion, the display support including a lock configured to selectively engage the display portion of the portable electronic device and prevent removal of the display portion from the keyboard portion when the lock is in a locked state; wherein the lock includes a pawl movable relative to the display support between a locked position, in which the pawl extends from the display support to engage the display portion, and an unlocked position, in which the pawl is not positioned to engage the display portion.

27. The docking station of claim 26, wherein the pawl translates relative to the display support.

28. The docking station of claim 26, wherein the display support includes a housing portion having a recess defined therein, and wherein the pawl is movable into and out of the recess.

29. The docking station of claim 28, wherein the pawl is coupled to a slider that is movably supported in the recess.

30. The docking station of claim 29, wherein the slider includes a recess into which a projection of the lock extends, the projection and recess cooperating such that moving the lock between locked and unlocked states selectively moves the slider within the recess.

* * * * *